United States Patent [19]
Zait et al.

[11] Patent Number: 5,693,415
[45] Date of Patent: Dec. 2, 1997

[54] COMPOSITE FILM FOR WINDOWS COMPRISING A NON-STOICHIOMETRIC ALUMINUM OXIDE LAYER

[75] Inventors: Eitan Zait; Avigail Matalon-Cohen, both of Kibbutz Hanita; Dan Eisenstadt, Nahariya, all of Israel

[73] Assignee: Hanita Coatings, Kibbutz Hanita, Israel

[21] Appl. No.: 493,262

[22] Filed: Jun. 21, 1995

[51] Int. Cl.$^6$ .................. B32B 27/36; B32B 15/08; B32B 9/04
[52] U.S. Cl. .................. 428/332; 428/336; 428/337; 428/412; 428/421; 428/458; 428/472.2; 428/480; 428/702; 428/913
[58] Field of Search .................. 428/458, 469, 428/472.2, 412, 480, 421, 332, 336, 337, 702, 913

[56] References Cited

U.S. PATENT DOCUMENTS

| | | | |
|---|---|---|---|
| 4,337,990 | 7/1982 | Fan et al. | 350/1.7 |
| 4,430,366 | 2/1984 | Crawford et al. | 427/162 |
| 4,835,061 | 5/1989 | Ohta et al. | 428/469 |
| 5,308,737 | 5/1994 | Bills et al. | 430/201 |

FOREIGN PATENT DOCUMENTS

| | | |
|---|---|---|
| 0437946 A2 | 7/1991 | European Pat. Off. |
| 7237276 | 9/1995 | Japan. |
| WO 86/02038 | 4/1986 | WIPO. |

*Primary Examiner*—H. Thi Le
*Attorney, Agent, or Firm*—Ladas & Parry

[57] ABSTRACT

A composite film adhereable to a surface of an object for changing its thermal and optical properties. According to one preferred embodiment the composite film includes a substrate, a non stoichiometric aluminum oxide layer deposited on one side of said substrate, and an adhesive layer for coating said non stoichiometric aluminum oxide layer, whereby said composite film is adhereable to a surface of said object. According to a second preferred embodiment the composite film includes a substrate, a first aluminum metal layer deposited on one side of said substrate, an aluminum oxide layer deposited on said first aluminum layer, a second aluminum layer deposited on said aluminum oxide layer, and an adhesive layer for coating said aluminum oxide layer, whereby said composite film is adhereable to a surface of said object. According to yet another preferred embodiment of the present invention the composite film includes a substrate, a first aluminum oxide layer deposited on one side of said substrate, an aluminum metal layer deposited on said first aluminum layer, a second aluminum oxide layer deposited on said aluminum oxide layer and an adhesive layer for coating said aluminum oxide layer, whereby said composite film is adhereable to a surface of said object.

8 Claims, 4 Drawing Sheets

COMPOSITE FILM FOR WINDOWS COMPRISING A NON-STOICHIOMETRIC ALUMINUM OXIDE LAYER

FIELD OF THE INVENTION

The present invention relates to composite films which are adhered to a surface of an object for changing its thermal and optical properties generally and more particularly to aluminum based composite films of this type.

BACKGROUND OF THE INVENTION

Composite films which may be adhered to the surface of objects, such as the window of a vehicle or a building, are well known in the art. These composite films are used to control the thermal and optical properties of the window to which they are adhered by changing its transmissivity and reflectivity to Infra Red (IR) and visible light.

Several types of films for changing the properties of windows are known, namely, dyed polyester films, aluminum metal based composite films, stainless steel based composite films and silver based composite films.

For example, U.S. Pat. No. 4,337,990 to Fan et al. describes a composite film which includes a metallic silver layer. The composite film described by Fan et al., as well as stainless steel based films are produced by magnetron sputtering. Another method employed for producing composite films for window coatings is solution coating.

Magnetron sputtering and solution coating are relatively slow and costly processes.

Thermal evaporation of metals and their oxides, in particular thermal evaporation of aluminum and its oxide on films, such as polyester films, are also known in the art. For example, U.S. Pat. No. 4,430,436 to Crawford et al. describes the use of thermal evaporation for producing metal oxide or metal sulfide composite films.

Composite films including a metal and its oxide coating are used for a range of applications.

U.S. Pat. No. 5,308,737 to Bills et al describe a laser imageable donor material used as an imaging substrate.

Published EP Patent Application 437,948 A3 to Kelly et al describes the use of composite films as a packaging substrate characterized by improved oxygen and/or moisture permeability.

SUMMARY OF THE INVENTION

An important object of the present invention is to provide a low cost easily manufactured composite film which is adhered to the surface of an object, such as a window, for changing its thermal and optical properties.

Another object of the present invention is to provide an aluminum based composite film produced by thermal evaporation, which is adhered to a surface of an object for changing its thermal and optical properties.

Yet another object of the present invention is to provide a composite film to be adhered to a window which provides relatively high reflectivity in the Infra Red (IR) region, in particular in the near IR region (750–2250 nanometers) of the electromagnetic spectrum and relatively low reflectivity in the visible region of the electromagnetic spectrum.

The present inventors have realized that a layer or layers of aluminum metal and aluminum oxide in various novel combinations provide an effective window coating having relatively high IR radiation reflectivity and relatively low visible light reflectivity.

The present inventors have further realized that thermal evaporation, previously used to obtain aluminum metal and its oxide, in particular non stoichiometric aluminum oxide, for producing substrates for the graphic and packaging industries, may be employed for obtaining the composite films of the present invention.

According to one aspect of the present invention, a non stoichiometric aluminum oxide ($Al_2O_3$), preferably with a surplus of aluminum (Al) is continuously deposited on a substrate, such as a polyester film to provide a coated polyester film which may be adhered to a surface of an object, such as a vehicle or building window.

According to a further aspect of the present invention, three separate aluminum based layers are continuously deposited on a substrate, such as the same polyester on which the non stoichiometric aluminum oxide layer is deposited.

According to one preferred embodiment of the present invention, the three layers are a first aluminum oxide layer, an aluminum metal layer and a second aluminum oxide layer.

According to another preferred embodiment of the present invention the three layers are a first aluminum metal layer, an aluminum oxide layer and a second aluminum metal layer which collectively provide a "Fabri-Perot" type construction.

There is thus provided, in accordance with a preferred embodiment of the present invention, a composite film adhereable to a surface of an object for changing its thermal and optical properties which includes a substrate, a non stoichiometric aluminum oxide layer deposited on one side of the substrate, and an adhesive layer, preferably an acrylic adhesive layer, for coating the non stoichiometric aluminum oxide layer, whereby the composite film is adhereable to a surface of the object.

There is also provided, according to another preferred embodiment of the present invention, a composite film adhereable to a surface of an object for changing its thermal and optical properties which includes a substrate, a first aluminum metal layer deposited on one side of the substrate, an aluminum oxide layer deposited on the first aluminum layer, a second aluminum metal layer deposited on the aluminum oxide layer and an adhesive layer, preferably an acrylic adhesive layer, for coating the second aluminum metal layer, whereby the composite film is adhereable to a surface of the object.

There is also provided, according to yet another preferred embodiment of the present invention a composite film adhereable to a surface of an object for changing its thermal and optical properties which includes a substrate, a first aluminum oxide layer deposited on one side of the substrate, an aluminum metal layer deposited on the first aluminum layer, a second aluminum oxide layer deposited on the aluminum oxide layer and an adhesive layer, preferably an acrylic adhesive layer, for coating the second aluminum oxide layer, whereby the composite film is adhereable to a surface of the object.

According to any of the preferred embodiment of the present invention, the substrate, the thickness of which preferably ranges between 10–200 microns, is selected from the group consisting of polyester, polyvynilydene fluoride and polycarbonate and the polyester is selected from the group consisting of polyethylene terephthalate and polyethylene naphthalate.

Further, according to any of the preferred embodiments of the present invention, the composite film may also include a protective layer between the adhesive layer and its adjacent aluminum based layer.

Further, according to a preferred embodiment of the present invention, any of the aluminum based layers is deposited by thermal evaporation on the substrate wherein the substrate is moving in a selected rate during the deposition, whereby the thickness of the non stoichiometric aluminum oxide layer is determined.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
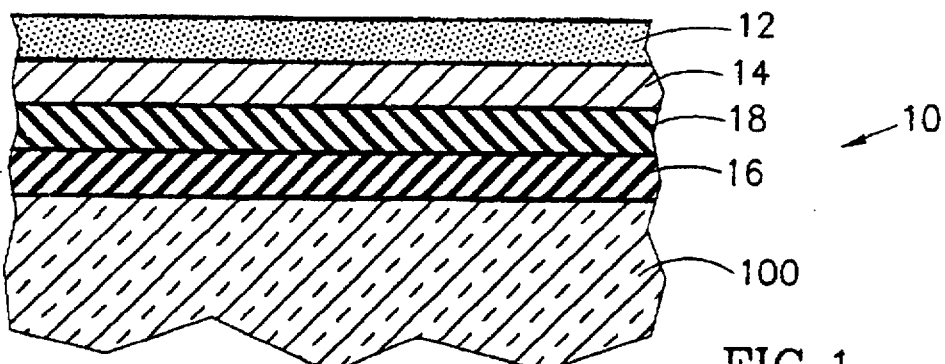
FIG. 1 is a schematic cross section illustration of a composite film, constructed according to a preferred embodiment of the present invention, and of the object to which the composite film is adhered.
Figure 2:
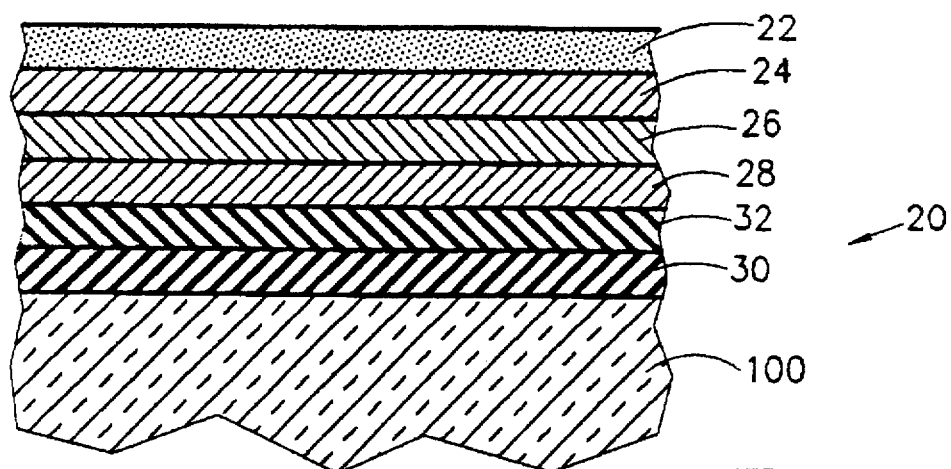
FIG. 2 is a schematic cross section illustration of a composite film, constructed according to a second preferred embodiment of the present invention, and of the object to which the composite film is adhered.
Figure 3:
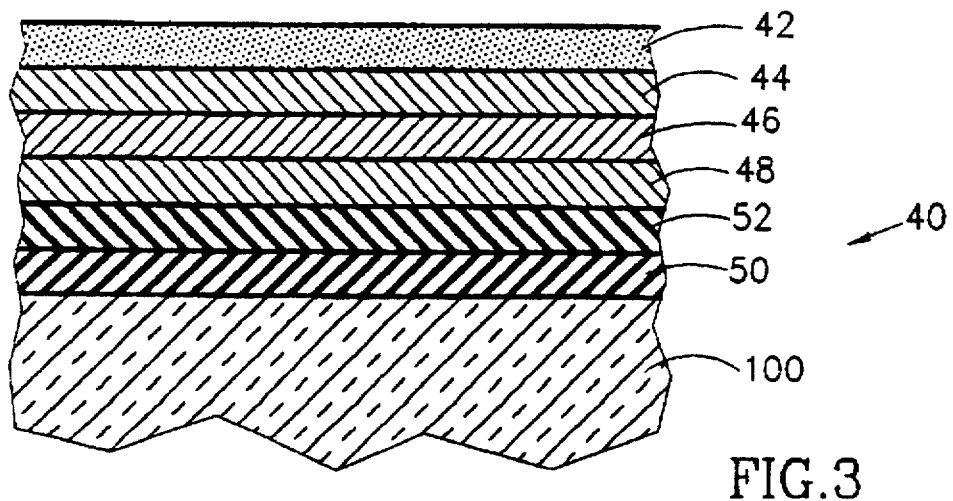
FIG. 3 is a schematic cross section illustration of a composite film, constructed according to a third preferred embodiment of the present invention and of the object to which the composite film is adhered.

Three preferred embodiments of the present invention provide three alternative constructions of aluminum based composite films, illustrated in FIGS. 1–3 which are suitable to be adhered to the surface of an object for changing its optical and thermal properties.

Reference is now made to FIG. 1. FIG. 1 illustrates a composite film, generally referenced 10, which comprises a substrate 12, preferably but not necessarily a polyethylene terephthalate polyester film ("polyester"). The polyester substrate 12 is coated with an aluminum oxide layer 14 characterized by a non stoichiometric ratio between aluminum and oxygen. The layer 14 is preferably deposited by thermal deposition under vacuum as described in more detail hereinbelow.

The composite film 10 also comprises an adhesion layer 16 which comprises an adhesive, such as an acrylic adhesive suitable for adhering the composite film 10 to a surface of an object 100. The adhesive may be selected in accordance with the specific object 100 to which the composite film is adhered.

As an optional layer, the composite film 10 may include a layer including a second laminated polyester layer 18 having an adhesive on one side for attachment to and protection of the aluminum oxide layer 14, the adhesive layer 16 being on the other side of polyester layer 18. The composite 10 may vary in its thickness. Typically, the thickness of each layer ranges as follows:

| | |
|---|---|
| polyester substrate 12 | 10–200 micron |
| non stoichiometric aluminum oxide layer 14 | 50–2000 Angstroms |
| adhesive layer 16 | 2–10 micron |
| polyester layer with adhesive 18 | 1.5–4 micron |

It will be appreciated that the properties of the composite film 10 may be controlled by varying the thickness of its layers to achieve the desired transmissivity to light, desired reflectivity to IR radiation and desired color.

Figure 4A:
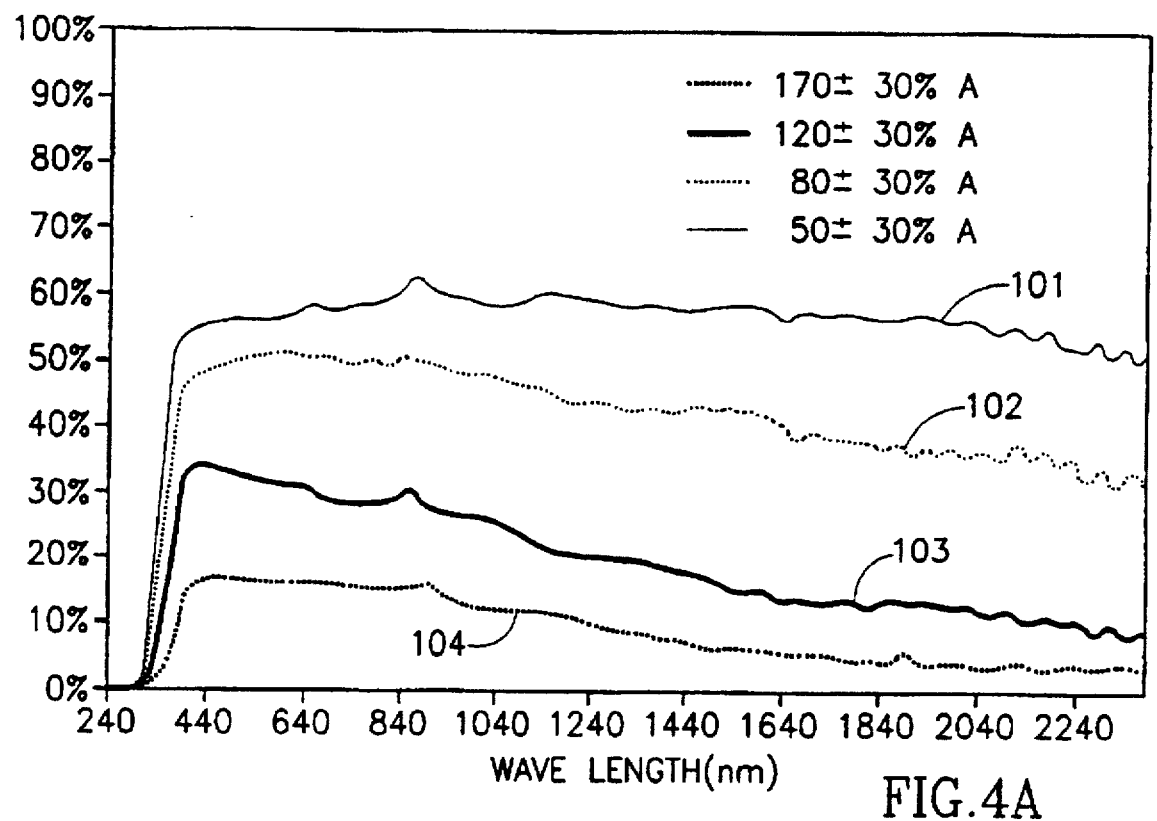
FIGS. 4A and 4B are graphs illustrating changes in the transmissivity and reflectivity, respectively, of the composite film of FIG. 1 according to changes in the thickness of its non stoichiometric aluminum oxide layer.
Figure 4B:
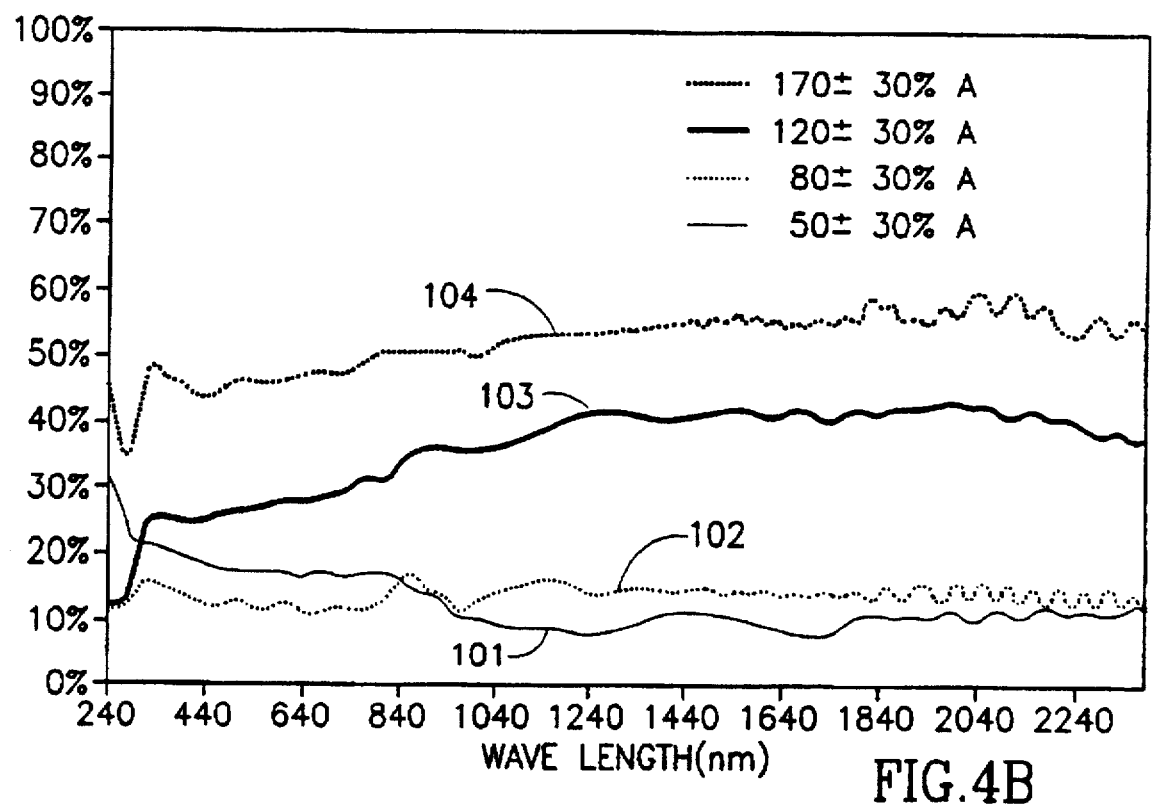

For example, as best seen from FIGS. 4A and 4B to which reference is now made, the transmissivity (FIG. 4A) and the reflectivity (FIG. 4B) of four examples of the composite film 10 changes with the thickness of the non stoichiometric aluminum oxide layer. In FIGS. 4A and 4B, the X-axis is the wavelength in nanometers and the Y-axis is the transmissivity (FIG. 4A) or reflectivity (FIG. 4B). As evident from FIGS. 4A and 4B, respectively, the transmissivity of four exemplary composite films 10, referenced 101, 102, 103 and 104 having a respective thickness, in Angstroms, of 50±30, 80±30, 120±30 and 170±30 decreases with increasing thickness and the reflectivity increases therewith.

The results of the experiments presented in FIGS. 4A–6 were obtained using a Lambda 9 Spectrometer, manufactured by Perkin-Elmer of Norwalk, Conn., U.S.A. for solar radiation at sea level. Calculation of transmissivity, reflectivity and absorption were calculated according to the A.S.T.M. E-903-82. Absorption is not shown since absorption in percentage is 100% less the sum in percentage of the transmissivity and reflectivity.

The color of the composite film 10 is grey and therefore it is most useful in many applications, such as vehicle and building window coating.

It will be appreciated that while the composite film 10 is prepared with the substrate 12 as the first layer on which the aluminum oxide layer 14 is coated and on which the adhesive layer 16 with or without the second polyester layer is applied, when the composite film 10 is adhered to an object 100 the order of the layers flips as seen in FIG. 1 so that the substrate layer 12 is the exposed layer facing away from the object 100.

A preferred method for producing the composite film 10 is the thermal evaporation method previously applied for producing light sensitive media for the graphic industry and packaging materials.

According to a preferred method of the present invention, a web of polyester film is introduced into a vacuum chamber of a continuous roll coater machine. The chamber is vacuumed to obtain high vacuum therein between $10^{-3}$–$10^{-5}$ Torr.

Aluminum is then deposited under a controlled flow of oxygen in a continuous fashion on the moving polyester substrate 12. The resulting coated layer 14 includes an oxygen deficient aluminum oxide comprising a mix of aluminum and aluminum oxide.

The thickness of the non stoichiometric aluminum oxide layer 14 is determined in two steps as follows:

A. The desired level of oxygen deficiency is determined by adjusting the oxygen flow; and B. The thickness of the layer is determined by selecting the rate in which the polyester web moved.

Preferably, the non stoichiometric aluminum oxide layer is deposited such that its thickness is substantially similar throughout the composite film 10.

Figure 5A:
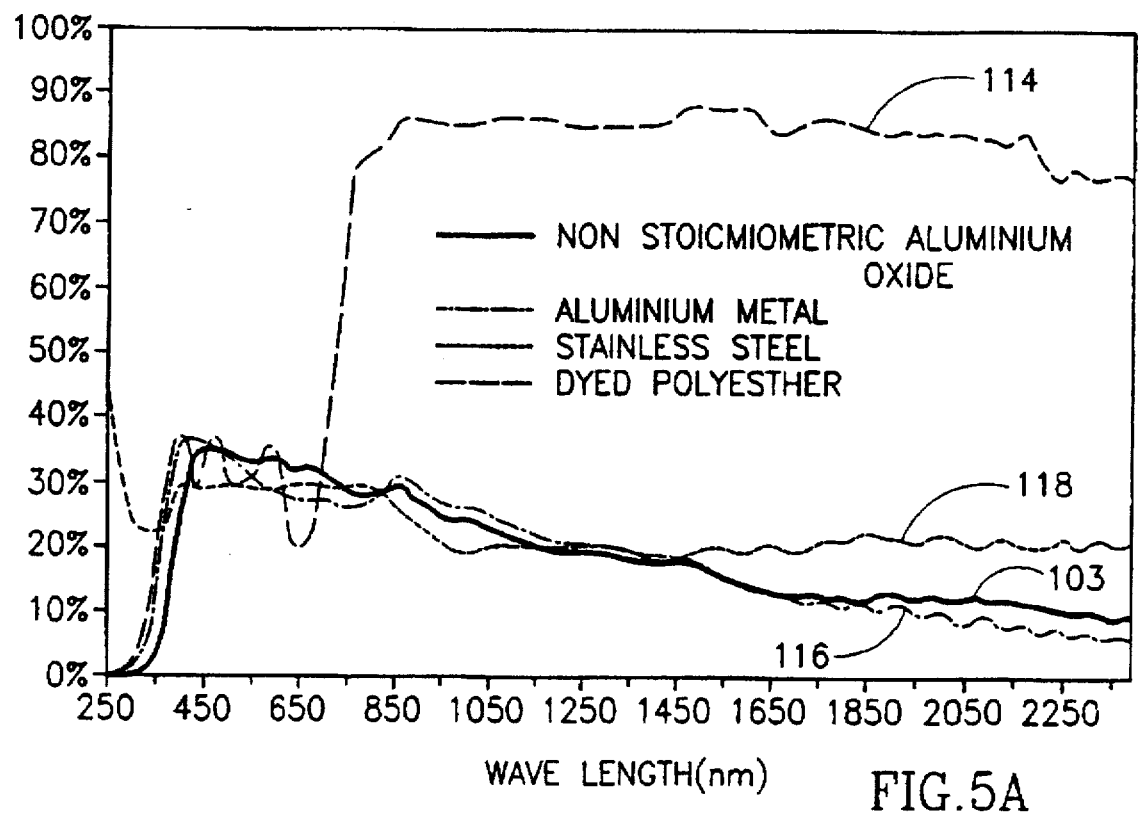
FIGS. 5A and 5B are graphs illustrating the transmissivity and reflectivity, respectively, as function of wavelength of the composite film of FIG. 1 in comparison to some prior art composite films.
Figure 5B:
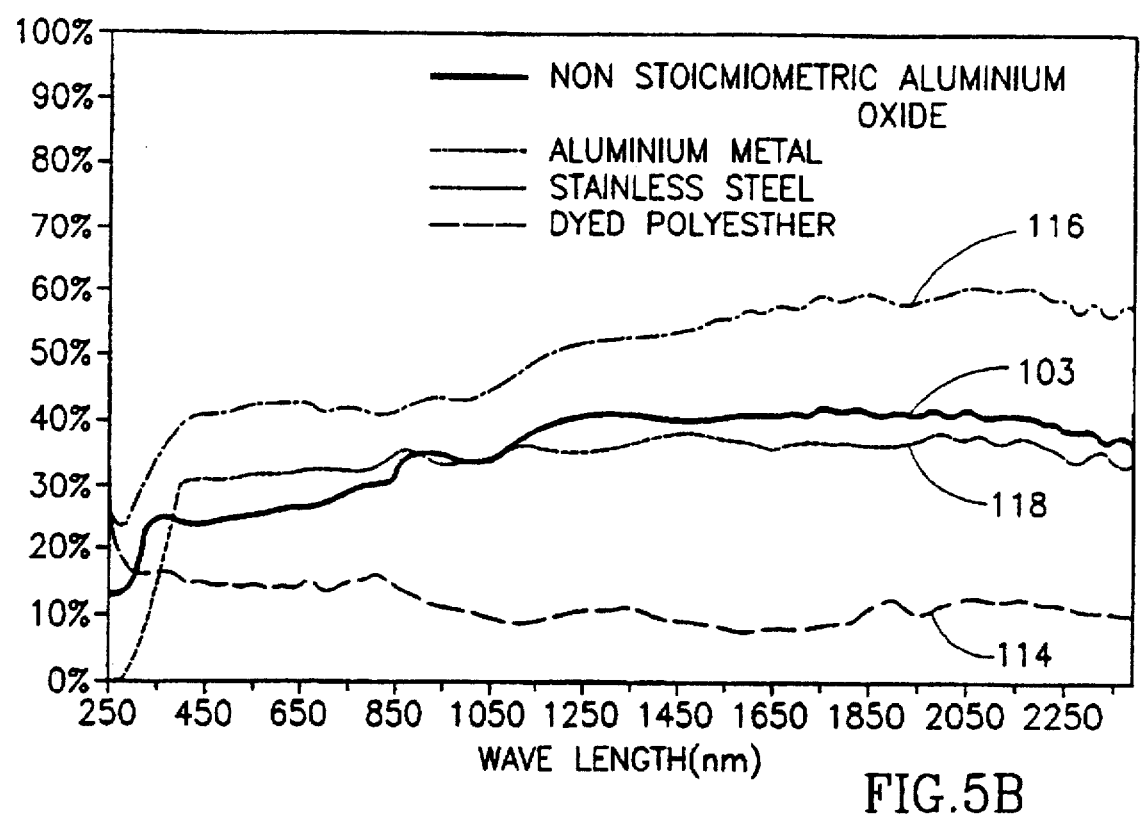

FIGS. 5A and 5B are graphs illustrating the properties of the composite film 10 in comparison to some prior art composite films. FIGS. 5A and 5B illustrate the transmissivity and reflectivity, respectively in the visible light range (400–750 nanometers) and in the near IR region (750–2250 nanometers).

As seen in FIG. 5A of which the X-axis is the wavelength in nanometers and the Y-axis is transmissivity in percentages, the composite film 10 which is the composite film 102 (FIGS. 4A–4B) provides superior results to uncoated dyed polyester films referenced 114 and comparable results to composite films based on a single layer aluminum metal (referenced 116) and stainless steel coating (referenced 118).

FIG. 5B which axes are similar to that of FIG. 5A illustrates the reflectivity of the composite film 10 compared with uncoated dyed polyester films 114 and with composite films based on aluminum metal 116 and stainless steel coating 118. It is evident from FIG. 5B that the composite film 10 provides lower reflectivity of light in the visible range when compared with both aluminum and stainless steel based composite film and thus its shininess is lower. It will be appreciated that lower shininess is a desired feature for vehicle windows and building windows applications.

A particular advantage of the composite film 10 with respect to other prior art composite films designed to be adhered to objects is its color and shininess. While prior art composite films based on silver or a single layer aluminum metal coating are shiny and having a silver like color, the composite film 10 is less shiny and having a neutral grey color desired both for windows of buildings and vehicle windows.

Reference is now made to FIGS. 2 and 3 which illustrate composite films based on more than one aluminum based layer. The composite film of FIG. 2, generally referenced 20 comprises a polyester substrate 22 coated by a first aluminum metal layer 24, a substantially stoichiometric aluminum oxide layer 26, a second aluminum metal layer 28 and an adhesive layer 30 for adhering the composite film to the object 100.

The composite film 20 may also include a second polyester layer 32 between the second aluminum metal layer 28 and the adhesive layer 30 in the same manner as described for the second laminated polyester layer 18 with respect to layer 14 and adhesive layer 16 of FIG. 1.

The composite 20 may vary in its thickness. Typically, the thickness of each layer ranges as follows:

| polyester substrate 22 | 10–200 micron |
| first aluminum layer 24 | 50–350 Angstrom |
| aluminum oxide layer 26 | 300–3000 Angstrom |
| second aluminum layer 28 | 50–350 Angstrom |
| adhesive layer 30 | 2–10 micron |
| polyester layer with adhesive 32 | 1.5–4 micron |

It will be appreciated that the properties of the composite film 20 can be controlled by varying the thickness of its layers to achieve the desired transmissivity to light, desired reflectivity to IR radiation and desired color.

Figure 6:
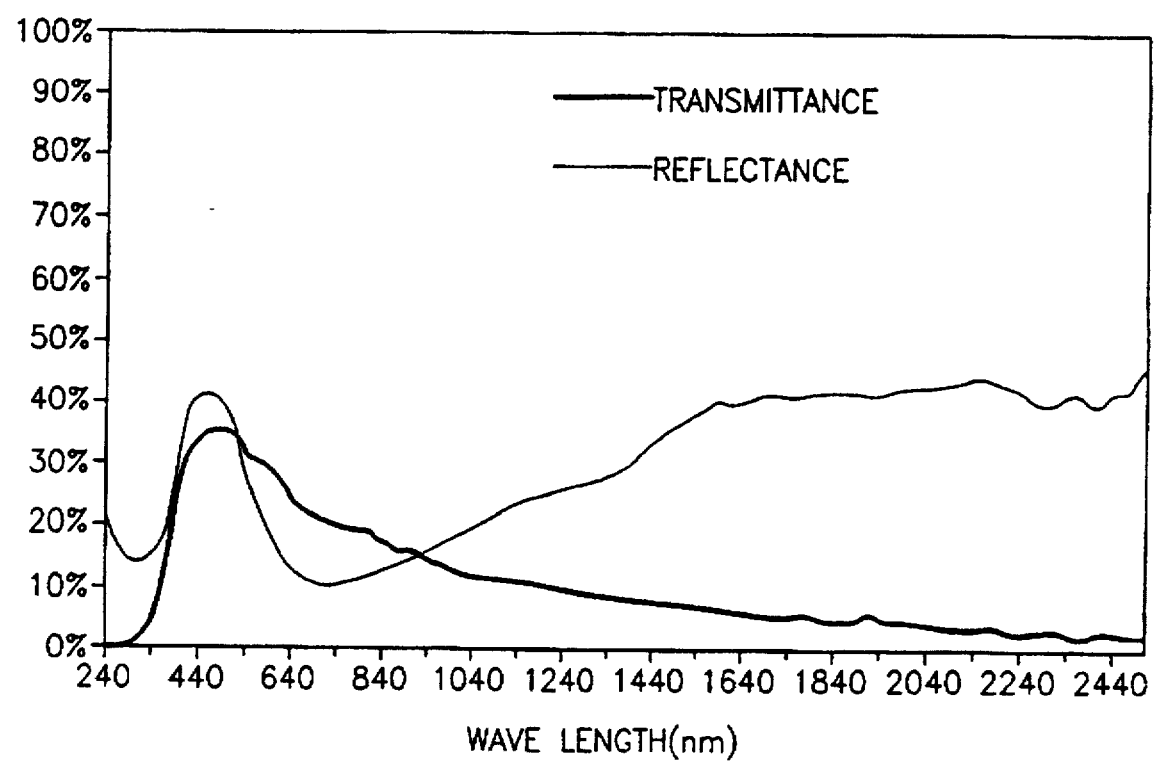
FIG. 6 is a graph illustrating the transmissivity and reflectivity of an example of the composite film of FIG. 2.

An example of the properties of an example of the composite film 20 having an aluminum metal layers of 80±30 Angstroms and an aluminum oxide layer having a thickness of 1400±100 Angstroms is provided in FIG. 6 to which reference is now made and of which the X-axis is the wavelength in nanometers and the Y-axis is the transmissivity and reflectivity in percentage.

It will be appreciated that the aluminum based layers of the composite film 20 create a "Fabri-Perot" type construction and therefore, the color of the composite film 20 is light blue. The blue color of the composite film 20 provides an alternative in terms of a desired color for the surface of the object 100 to the grey like color of the composite film 10.

The composite film of FIG. 3, referenced generally 40, comprises a polyester substrate 42 similar to the substrates 12 and 22, a first stoichiometric aluminum oxide layer 44, an aluminum metal layer 46, a second aluminum oxide layer 48, and a self adhesive layer 50 for adhering the composite film 40 to the object 100.

The composite film 40 may also include a second polyester layer 52 which is similar to the polyester layer 18 and 32 between the second aluminum oxide layer 48 and the adhesive layer 50.

The composite film 40 may vary in its thickness. Typically, the thickness of each layer ranges as follows:

| polyester substrate 42 | 10–200 micron |
| first aluminum oxide layer 44 | 300–1400 Angstrom |
| aluminum metal layer 26 | 50–350 Angstrom |
| second aluminum oxide layer 28 | 300–1400 Angstrom |
| adhesive layer 50 | 2–10 micron |
| polyester layer with adhesive 52 | 1.5–4 micron |

It will be appreciated that the properties of the composite film 40 can be controlled by varying the thickness of its layers to achieve the desired transmissivity to light, desired reflectivity to IR radiation and the exact desired color.

The color of the composite film 40 is a light blue-grey type color providing an alternative color, when desired, to the color of the composite films 10 and 20.

It will be appreciated that the aluminum based layers of the composite films 20 and 40 are deposited on their respective substrate by thermal evaporation as describe with respect to the composite film 10. However, for the aluminum metal layers 24 and 28 of composite film 20 and the aluminum metal layer 46 of the composite film 40, substantially no oxygen is introduced into the vacuum chamber during the continuous deposition. For the aluminum oxide layers 26, 44 and 48 the flow of oxygen is controlled to provide a substantially stoichiometric aluminum oxide deposition.

Samples of the composite films 10, 20 and 40 were tested to check their durability and applicability as heat mirrors. The durability tests were carried in the Q.U.V. accelerated weathering test system, manufactured by Q. Panel of Cleveland, Ohio, U.S.A.

All films were exposed to repeated cycles of Ultra Violet radiation, humidity and heat for at least 1600 hours, the standard time required for such tests. All composite films passed the test, i.e. their light transmissivity and IR reflectivity have not been changed and no visual defects or any change in their physical structure was detected.

It will be appreciated that the preferred embodiments described hereinabove are described by way of example only and that numerous modifications thereto, all of which fall within the scope of the present invention, exist. For example, while the present invention is described with respect to a polyethylene terephthalate polyester substrate, all of the composite films 10, 20 and 40 may comprise a polyethylene naphthalate polyester film or any other suitable film of the polyester, polyvynilydene fluoride or polycarbonate.

Another example is that any of the adhesive layers 16, 30 and 50 may include a peelable laminate layer which protects the adhesive layer. The peelable layer is peeled once the composite film is adhered to the surface of an object, such as the object 100.

It will be appreciated by persons skilled in the art that the present invention is not limited to what has been particularly shown and described hereinabove. Rather, the scope of the present invention is defined only by the claims that follow:

We claim:

1. A composite film adhereable to a surface of an object for changing its thermal and optical properties comprising:
   a substrate;
   a layer consisting of nonstoichiometric aluminum oxide deposited on one side of said substrate and bonded thereto, said non stoichiometric aluminum oxide layer having a substantially uniform thickness; and
   an adhesive layer for coating said nonstoichiometric aluminum oxide layer on its side opposite said substrate, whereby said composite film is adhereable to a surface of said object.

2. A composite film according to claim 1 and also comprising a protective layer between said non stoichiometric aluminum oxide layer and said adhesive layer, said protective layer being adhesively secured to said aluminum oxide layer.

3. A composite film according to claim 1 wherein said substrate is selected from the group consisting of polyester, polyvynilydene fluoride and polycarbonate.

4. A composite film according to claim 3 wherein said polyester is selected from the group consisting of polyethylene terephthalate and polyethylene naphthalate.

5. A composite film according to claim 4 wherein the thickness of said substrate ranges between 10–200 microns.

6. A composite film according to claim 1 wherein said non stoichiometric aluminum oxide layer comprises a surplus of aluminum with respect to stoichiometric $Al_2O_3$.

7. A composite film according to claim 6 wherein said non stoichiometric aluminum oxide layer is deposited by thermal evaporation on said substrate wherein said substrate is moving in a selected rate during said deposition, whereby the substantially constant thickness of said non stoichiometric aluminum oxide layer is determined.

8. A composite film according to claim 6 wherein the thickness of said non stoichiometric aluminum oxide layer ranges between 50–2000 Angstroms, the composite film being a neutral grey color.

* * * * *